US012157209B2

(12) United States Patent
Boccellato et al.

(10) Patent No.: US 12,157,209 B2
(45) Date of Patent: Dec. 3, 2024

(54) ELECTRONIC TORQUE WRENCH WITH OBSTACLE DETECTION

(71) Applicant: SCS CONCEPT S.R.L., Cusano Milanino (IT)

(72) Inventors: Roberto Boccellato, Seriate (IT); Carlo Giuseppe Tinti, Noviglio (IT)

(73) Assignee: SCS CONCEPT S.R.L., Cusano Milanino (IT)

( * ) Notice: Subject to any disclaimer, the term of this patent is extended or adjusted under 35 U.S.C. 154(b) by 374 days.

(21) Appl. No.: 17/628,686

(22) PCT Filed: Jul. 24, 2020

(86) PCT No.: PCT/IB2020/056988
§ 371 (c)(1),
(2) Date: Jan. 20, 2022

(87) PCT Pub. No.: WO2021/019392
PCT Pub. Date: Feb. 4, 2021

(65) Prior Publication Data

US 2022/0266428 A1 Aug. 25, 2022

(30) Foreign Application Priority Data

Jul. 26, 2019 (IT) ........................ 102019000013089

(51) Int. Cl.
*B25B 23/142* (2006.01)

(52) U.S. Cl.
CPC ................................ *B25B 23/1425* (2013.01)

(58) Field of Classification Search
CPC .................................................. B25B 23/1425
See application file for complete search history.

(56) References Cited

U.S. PATENT DOCUMENTS 4,006,629 A * 2/1977 Barrett ................ B25B 23/1425 73/862.26
4,864,841 A 9/1989 Heyraud
6,119,562 A 9/2000 Jenkins

OTHER PUBLICATIONS

International Search Report for PCT Application No. PCT/IB2020/056988. Mail Date: Oct. 16, 2020. 1 page.

* cited by examiner

*Primary Examiner* — Walter L Lindsay, Jr.
*Assistant Examiner* — Andrew V Do
(74) *Attorney, Agent, or Firm* — Perkins Coie LLP; Sean Seokwon Lee; Viola T. Kung

(57) ABSTRACT

An electronic torque wrench (10) comprises a body with an axial extension along a longitudinal axis; a front end provided with a coupling (14) intended to engage the wrench on a joint to be tightened by manual rotation around a rotation axis (15) which is transverse to the longitudinal axis (11); a handle (13) along the body for operating the wrench; and a sensor (16) for detecting a torque applied with the wrench to the coupling (14) and comprising two flex sensor elements (16*a* and 16*b*) which are arranged spaced apart along the longitudinal axis (11). An electronic control circuit (17) is connected to the sensor (16) for receiving signals from it and applying a method which comprises the steps of calculating, depending on the flexing values detected by the two sensor elements (16*a* and 16*b*), whether the flexing value detected by the sensor element closest to the front end is less than the flexing value detected by the sensor element farthest from the end front; and, if so, emitting an error signal.

6 Claims, 2 Drawing Sheets

ELECTRONIC TORQUE WRENCH WITH OBSTACLE DETECTION

This application is a National Stage of International Application PCT/IB2020/056988, filed Jul. 24, 2020; which claims the priority of Italian Application No. 102019000013089, filed Jul. 26, 2019. The contents of the above-identified applications are incorporated herein by reference in their entireties.

The present invention relates to an innovative electronic torque wrench.

In the prior art electronic wrenches for performing the manual tightening of threaded joints (for example bolts) by means of rotation are known.

These wrenches are generally made with a long body provided with a handle for gripping the wrench and have a free front end which is provided with a suitable coupling for engaging the wrench on the joint to be rotated.

These wrenches have torque sensors and electronic circuitry which, depending on the detection performed by the sensors, show on the display the tightening torque applied to the joint by means of the wrench.

The wrench may optionally also comprise a rotation sensor for detecting also the tightening angle and for correlating it to the torque applied to the joint.

For correct calculation of the torque it is obviously important for the wrench to be correctly used by the user. For example, it is important that, during the rotation movement, the wrench should not encounter obstacles which alter the measurement. Usually the user must check visually whether such a situation occurs. However, it may happen that the contact between the wrench and an obstacle is not detected by the user, either because not noticed or because the obstacle is not directly visible to the user (for example because the wrench is used in confined spaces which are full of projecting parts, as for example in in the case of an engine compartment).

In such cases, the measurement is altered without the user noticing.

The general object of the present invention is to provide an electronic wrench which automatically detects incorrect operating conditions and signals them in good time to the user.

In view of this object the idea which has occurred, according to the invention, is to provide a control method in an electronic torque wrench, the wrench comprising: a body with an axial extension along a longitudinal axis; a front end provided with a coupling intended to engage the wrench on a joint to be tightened by means of manual rotation around a rotation axis which is transverse to the longitudinal axis; a handle along the body for operating the wrench; a sensor for detecting a torque applied with the wrench to the coupling and comprising two flex sensor elements which are arranged spaced apart along the longitudinal axis; an electronic control circuit which is connected to the sensor for receiving signals from it; the method comprising the steps of calculating, depending on the flexing values detected by the two sensor elements (16*a* and 16*b*), whether the flexing value detected by the sensor element closest to the front end is less than the flexing value detected by the sensor element farthest from the front end; and, if so, emitting an error signal.

Moreover, the idea has occurred to provide, according to the invention, also a wrench with an electronic circuit configured to carry out the aforementioned method. In order to illustrate more clearly the innovative principles of the present invention and its advantages compared to the prior art, examples of embodiment applying these principles will be described below with the aid of the accompanying drawings.

Figure 1:
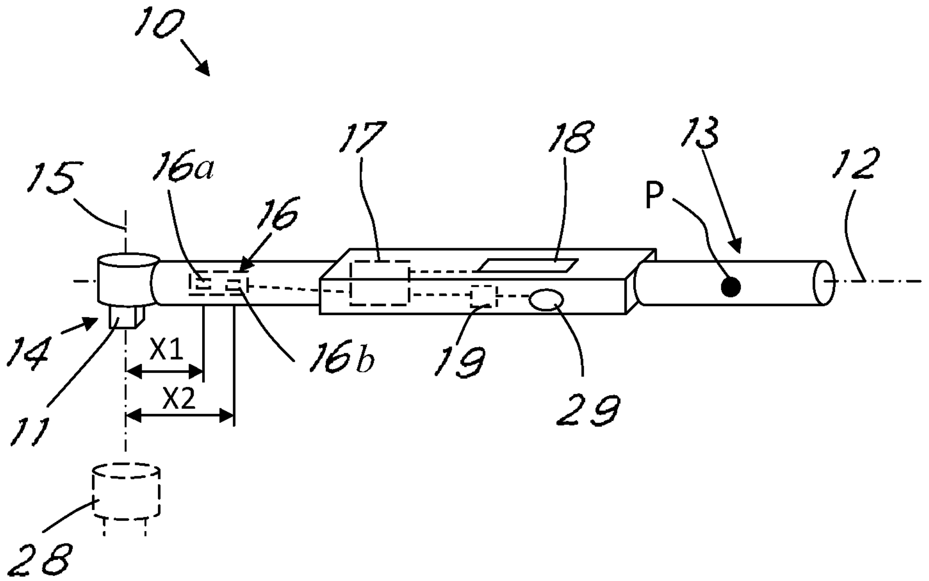
FIG. 1 shows a schematic perspective view of an electronic wrench applying the principles of the invention.

With reference to the figures, FIG. 1 shows an electronic torque wrench according to the invention, denoted generally by 10.

The wrench 10 has a long body with a mainly axial extension along a main longitudinal axis 12. The body 12 defines externally a handle 13 for gripping and manually rotating the wrench during use. The handle is situated advantageously close to a rear end of the wrench. If required, the handle 13 may also be shaped laterally for convenient gripping with one hand and also covered with suitable relatively soft material (such as rubber), as may be easily imagined by the person skilled in the art.

At a front end of the wrench there is a coupling 14 intended to engage a threaded joint 28 (not shown in detail) to be tightened by means of rotation of the wrench about a second rotation axis 15 (which is made to coincide with the rotation axis of the threaded joint) which is transverse to the main axis 12 of the wrench.

The coupling 14 is advantageously provided with an interchangeable insert 11 for adapting the wrench to the joint which is to be tightened, according to a technique known per se and not further shown or described here.

For example, the insert may have a known hexagonal seat for receiving the head of the joint (for example the head of a bolt) with a corresponding hexagonal shape. Between the handle 13 and the coupling 14 the wrench comprises a known flex sensor 16 (for example using resistance strain gauges) for detecting the flexing of the wrench, said flexing depending on the torque which is applied to the coupling with the wrench.

An electronic control circuit 17, known per se, located in the wrench will receive the signal produced by the sensor 16 and will calculate from it the torque applied with the wrench and will show it on a suitable display 18, using a technique which is substantially known and therefore will not be further described here in detail. The wrench may also comprise an acoustic signalling device 19 (for example a loudspeaker or a buzzer) connected to the circuit 17 for emitting sounds upon operation.

Preferably, the wrench may also comprise a known gyroscopic sensor 19 for detecting the rotation angle of the wrench around the rotation axis 15 and transmitting it to the electronic control circuit 17, for example so as to allow it to calculate and if necessary show on the display the information relating to the torque detected depending on the rotation angle of the wrench and, therefore, of the joint to which the torque is applied.

The sensor 16 is formed by two flex sensor elements 16*a* and 16*b* (advantageously strain gauges, for example connected in a measuring bridge) so as to measure flexing of the wrench at two points $X_1$ and $X_2$ which are spaced apart along the main axis of the wrench. The mutual spacing of the two elements 16*a* and 16*b* will depend for example on the sensitivity of the sensor elements, as will be explained below, so that the two sensors may detect with suitable precision the difference in flexing due to the different distance from the axis 15.

As is known, in fact, the bending of a beam fixed at one end and with a force applied at a point along it is proportional to the distance along the beam from the fixing point. Moreover, the bending moment varies along the beam with the progression of the bending and is a straight line with moment equal to zero at the point where the force is applied and maximum moment at the fixed end. In the case of a wrench this maximum moment is the torque applied to the joint being tightened.

For example, let is consider for sake of simplicity a Cartesian plane with the axis X coinciding with the axis 12 and having its origin in the insert (namely where the rotation axis 15 intersects the main axis 12). The positions on the axis X of the two sensor elements 16*a* and 16*b* are indicated respectively by $X_1$ and $X_2$. All this is shown in schematic form by way of example in FIG. 1.

Figure 2:
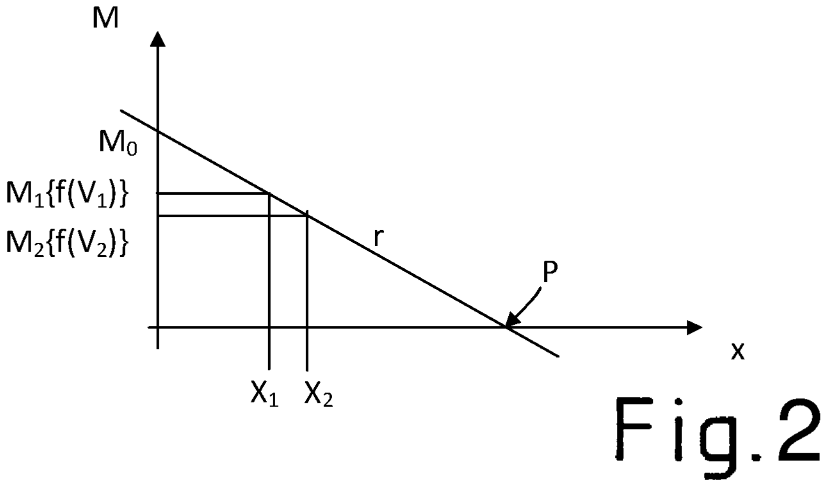
FIG. 2 shows a schematic graph of a possible progression of the bending moment along the axis of the wrench.

Knowing the positions $X_1$, $X_2$ of the two sensor elements 16*a* and 16*b*, the electronic control circuit (for example a suitably programmed microprocessor system known per se) may calculate the moment $M_0$ applied by the wrench to the joint based on the flexing values $V_1$ and $V_2$ detected by the two sensor elements 16*a* and 16*b*, suitably calibrated to determine the law of proportionality M=f(V) between the values V detected by the sensor elements and the moment M. This is schematically shown in the graph of FIG. 2 which shows by way of example a straight line r which represents the progression of the moment M as a function of X along the wrench. The point P (i.e. where M=0) is the point of application of the force, i.e. the point where the user's hand operates the handle 13 in order to rotate the wrench about the axis 15.

Figure 3:
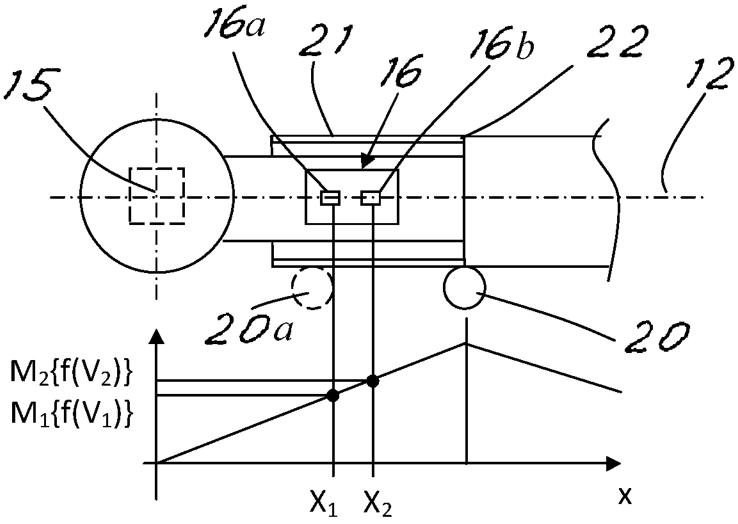
FIG. 3 shows in schematic form a possible embodiment of a part of the wrench shown in FIG. 1 and the corresponding diagram of the bending moment along the wrench for detecting an obstacle.

FIG. 3 shows a detail of the front zone of the wrench which comes up against a general obstacle, indicated by 20, during its rotation about the axis 15. The same figure shows the change in the graph of the bending moment along the main axis 12, due to an obstacle.

In fact, in the case of normal operation without obstacles, the wrench may be compared to a beam with one end (the insert) fixed and a load (the rotation force F applied by the user) at the point P, as already described above with reference to FIG. 2.

In the case where the wrench encounters an obstacle during rotation, the wrench may instead be compared to a beam with one end (the insert) which is fixed, a load (the rotation force F applied by the user) at the point P and an intermediate support at the point where the obstacle is present.

In this situation, the distribution of the moments along the wrench changes from a straight line r, as shown in FIG. 2, to a broken line formed by two straight sections $r_1$ and $r_2$ with a maximum value in the region of the obstacle and zero values at the fixed end (insert) and at the point P where the user applies the rotation force.

If the point where the wrench strikes the obstacle is upstream of the sensor elements 16*a*, 16*b* (namely between the sensor elements and the gripping point P), the values $V_1$ and $V_2$ detected by the sensor elements 16*a* and 16*b* become $V_1<V_2$ (before the obstacle was struck these values were $V_1>V_2$, as can be seen in FIG. 2)

The electronic control circuit of the wrench may therefore carry out a test on the values produced by the sensor elements 16*a* and 16*b*. If the test shows that the sensor element closest to the rotation axis 15 provides a value less than that of the sensor element farthest from the rotation axis 15, this means that the wrench has encountered an obstacle during rotation.

Obviously, the test may be performed by simply comparing the values $V_1$ and $V_2$ or by calculating the slope of the straight line $r_1$ (slope which from negative, as shown in FIG. 2, becomes positive if there is an obstacle).

Basically, the method according to the invention comprises the steps of calculating, depending on the flexing values detected by the two sensor elements 16*a* and 16*b*, whether the flexing value detected by the sensor closest to the front end is less than the flexing value detected by the sensor element farthest from the front end and, if so, emitting an error signal.

As can be seen from FIG. 3, the anomalous situation resulting from the presence of an obstacle is thus detected and the wrench may signal the error condition to the user, for example by means of an acoustic signal emitted by the acoustic signalling device 29 and/or a visual message, for example on the display 18.

As mentioned above, in order to be able to detect correctly the obstacle, the point along the main axis 12 of the wrench on which the obstacle acts must be upstream of the sensor elements 16*a* and 16*b*. Usually these sensor elements may be located relatively close to the rotation axis 15 in relation to the overall length of the wrench. It is therefore highly likely that this situation always occurs during normal use of the wrench.

If in any case obstacles present along the wrench section between the sensor elements and the rotation axis 15 are to be detected, this section may be provided with a suitable protection contrained to a point of the wrench situated upstream of the sensors so that the obstacle acts against this protection at this point.

For example, FIG. 3 shows a protection 21 which surrounds the section of the part of the wrench which flexes during use of the wrench and which contains the flex sensor elements 16*a* and 16*b*.

This protection, which is made sufficiently rigid, extends freely towards the front or head end of the wrench, while on the opposite side it is constrained to the wrench body in a zone 22 upstream of the sensors (i.e. in a zone between the sensor elements and the handle). For example, this protection may be a section of a cylindrical tube.

Owing to the protection 21, any obstacle 20*a* which might be present between the sensor elements and the rotation axis 15 along the section where the protection is situated will press against the protection 21 downstream of the sensors, but will cause an action on flexing of the wrench which will occur upstream of the said sensors, i.e. at the point where the protection 21 is constrained to the wrench. Thus, the graph of the broken line produced by the obstacle remains substantially that shown in FIG. 3, in the case of an obstacle 20 upstream of the sensors.

Figure 4:
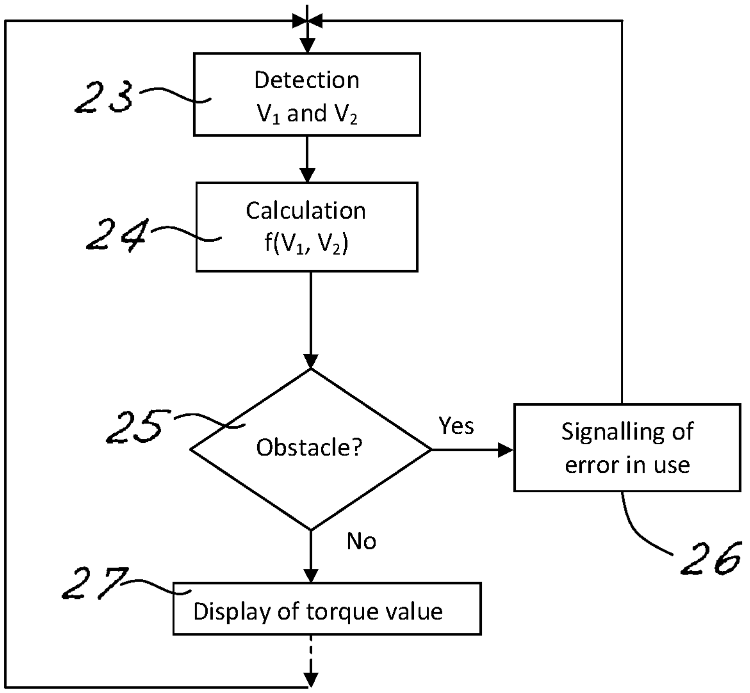
FIG. 4 shows a possible block diagram for possible operation of the wrench according to the invention.

By way of example, FIG. 4 shows a possible block diagram relating to application of the method according to the invention in the wrench. This diagram may be for example the flow diagram of the part of the program for checking for the presence of an obstacle, contained in a program which is stored in the microprocessor of the electronic circuit 17 for operation of the wrench.

Essentially, during measurement of the torque, the wrench detects in step 23 the values $V_1$ and $V_2$ provided by the sensor elements 16*a* and 16*b* and these values are used, according to a known system, also for calculation of the torque. The wrench calculates in step 24 the relationship between the two values detected and if in step 25 the test as to the result of the calculation shows that the wrench has encountered an obstacle (basically whether $V_1<V_2$ for example), the wrench signals the error condition in step 26. If instead in step 25 there is no obstacle, in step 27 the torque applied with the wrench to the joint is displayed normally, and so on.

At this point it is clear how the objects of the invention have been achieved, providing an electronic wrench and a control method which allow the detection and signalling of incorrect operating conditions of the wrench.

Basically, if the flexing value detected by the sensor element closest to the front end is greater than the flexing value detected by the sensor element farthest from the front end, it is possible to perform the step of calculating, depending on the flexing values detected by the two sensor elements 16*a* and 16*b*, the rotation torque applied with the wrench to the coupling 14, and the value of this torque may be displayed as being correct.

Obviously the above description relating to application of the innovative principles of the present invention is provided by way of example of these innovative principles and must therefore not be regarded as limiting the scope of the rights claimed herein. For example, the wrench may have a structure different from that shown, for example, for transmission of the tightening data to an external control unit, instead of displaying said data on its own display. The error signal may also be produced by means of indicator lamps on the wrench, instead of using symbols or text on a graphics display, and by means of various acoustic signals, as may be now easily imagined by the person skilled in the art.

Moreover, the wrench may be provided with various further functions known per se for this type of tool, such as indication of the start and end of the measurement operation, reaching of a pre-set tightening value, the charged state of an internal electric battery (if present for powering thereof), the presence of a connection with an external unit, automatic detection of the type of removable insert engaged in the wrench, and changes in the measurement produced by this insert for automatic correction thereof, etc.

The invention claimed is:

1. A control method in an electronic torque wrench (10), the wrench (10) comprising:

a body with an axial extension along a longitudinal axis (11);

a front end provided with a coupling (14) to engage the electronic torque wrench on a joint to be tightened by manual rotation around a rotation axis (15) which is transverse to the longitudinal axis (11);

a handle (13) along the body for operating the electronic torque wrench;

a sensor (16) for detecting a torque applied with the electronic torque wrench to the coupling (14) and comprising two flex sensor elements (16*a* and 16*b*) which are arranged spaced apart along the longitudinal axis (11);

an electronic control circuit (17) which is connected to the sensor (16) for receiving signals from it;

the method comprising the steps of:

determining, depending on flexing values detected by the two flex sensor elements (16*a* and 16*b*), whether a flexing value detected by the flex sensor element closest to the front end is less than a flexing value detected by the flex sensor element farthest from the end front; and, if so, emitting an error signal.

2. The method according to claim 1, characterized in that the error signal is shown on a display on the body of the electronic torque wrench and/or is indicated acoustically with the emission of a sound.

3. The method according to claim 1, characterized in that, if the flexing value detected by the sensor element closest to the front end is greater than the flexing value detected by the sensor element farthest from the front end, the step of calculating, depending on the flexing values detected by the two sensor elements (16*a* and 16*b*), the torque applied with the wrench to the coupling (14) is performed.

4. An electronic torque wrench (10) comprising:

a body with an axial extension along a longitudinal axis (11);

a front end provided with a coupling (14) to engage the electronic torque wrench on a joint to be tightened by manual rotation around a rotation axis (15) which is transverse to the longitudinal axis (11); and a handle (13) along the body for operating the electronic torque wrench;

a sensor (16) for detecting a torque applied with the electronic torque wrench to the coupling (14) and comprising two flex sensor elements (16*a* and 16*b*) which are arranged spaced apart along the longitudinal axis (11);

an electronic control circuit (17) which is connected to the sensor (16) for receiving signals from it;

wherein the two flex sensor elements (16*a* and 16*b*) are connected to the said electronic control circuit (17), the said electronic circuit (17) being configured for receiving from the two flex sensor elements (16*a* and 16*b*) signals depending on the flexing values detected by the two sensor elements (16*a* and 16*b*), and the said electronic control circuit (17) being configured for emitting an error signal when the signals depending on the flexing value detected by the sensor elements are indicating that the flexing value detected by the sensor element closest to the front end is less than the flexing value detected by the sensor element farthest from the end front.

5. The electronic torque wrench (10) according to claim 4, further comprising a display on the body of the electronic torque wrench and/or an acoustic signaling device which are connected to the electronic control circuit for emitting the error signal.

6. The electronic torque wrench (10) according to claim 4, characterized in that it comprises an external protection (21) which surrounds a section of the electronic torque wrench which contains the flex sensor elements (16*a*, 16*b*), the external protection (21) having one end which is free towards the front end of the electronic torque wrench and being constrained to the electronic torque wrench in an area of the wrench between the flex sensor elements (16*a* and 16*b*) and the handle (13).

* * * * *